United States Patent
Chen

(10) Patent No.: US 9,143,945 B2
(45) Date of Patent: Sep. 22, 2015

(54) UNLOCKING MOBILE TERMINAL AND UNLOCKING METHOD

(71) Applicant: ShenZhen Goldsun Network Intelligence Technology Co., Ltd., ShenZhen (CN)

(72) Inventor: Yi-An Chen, New Taipei (TW)

(73) Assignee: ShenZhen Goldsun Network Intelligence Technology Co., Ltd., ShenZhen (CN)

( * ) Notice: Subject to any disclaimer, the term of this patent is extended or adjusted under 35 U.S.C. 154(b) by 0 days.

(21) Appl. No.: 14/228,936

(22) Filed: Mar. 28, 2014

(65) Prior Publication Data

US 2015/0004936 A1    Jan. 1, 2015

(30) Foreign Application Priority Data

Jun. 26, 2013   (TW) .............................. 102122862 A

(51) Int. Cl.
*H04W 12/08*     (2009.01)
(52) U.S. Cl.
CPC ..................................... *H04W 12/08* (2013.01)

(58) Field of Classification Search
CPC ...... H04W 12/08; G06F 21/30; G06F 3/0338; G06F 3/0487
See application file for complete search history.

(56) References Cited

U.S. PATENT DOCUMENTS

| | | | |
|---|---|---|---|
| 2012/0226912 A1* | 9/2012 | King | 713/183 |
| 2014/0073391 A1* | 3/2014 | Lin | 463/16 |

\* cited by examiner

*Primary Examiner* — Kashif Siddiqui
*Assistant Examiner* — Minjung Kim
(74) *Attorney, Agent, or Firm* — Novak Druce Connolly Bove + Quigg LLP

(57) ABSTRACT

A mobile terminal includes a touchpad, a background system, and a MEMS gyroscope. The background system includes a control module, an indicating needle displaying module, and a divided circle displaying module. The indicating needle displaying module displays an indicating needle in the touchpad. The divided circle displaying module displays a divided circle in the touchpad. Each scale of the divided circle corresponds to a code. The divided circle rotates with the mobile terminal to enable the indicating needle to be aligned with one scale of the divided circle. The MEMS gyroscope holds the indicating needle to be unmovable. The touchpad sends the one code to the control module after sensing a click gesture. The control module unlocks the mobile terminal after determining that a plurality of codes sent by the touchpad matches predetermined codes.

6 Claims, 4 Drawing Sheets

UNLOCKING MOBILE TERMINAL AND UNLOCKING METHOD

FIELD

The present disclosure generally relates to an unlocking mobile terminal and an unlocking method.

BACKGROUND

Mobile terminals are widely used in everyday life. The size of the mobile terminals has becomes greater than before. In addition, each mobile terminal is locked during down time. It can be inconvenient to unlock the mobile terminal for operation with two hands.

BRIEF DESCRIPTION OF THE DRAWINGS

Many aspects of the embodiments can be better understood with parameters to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like parameters indicate similar elements. It should be noted that parameters to "an" or "one" embodiment in this disclosure are not necessarily to the same embodiment, and such parameters mean "at least one."

Figure 1:
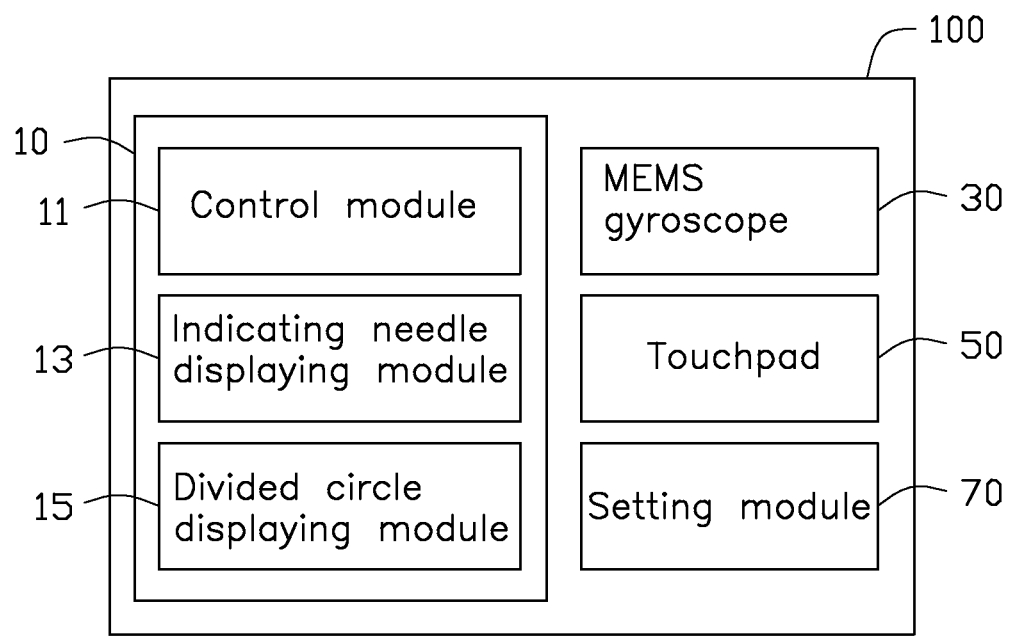
FIG. 1 is a block diagram of a mobile terminal in accordance with an embodiment of the disclosure.
Figure 2:
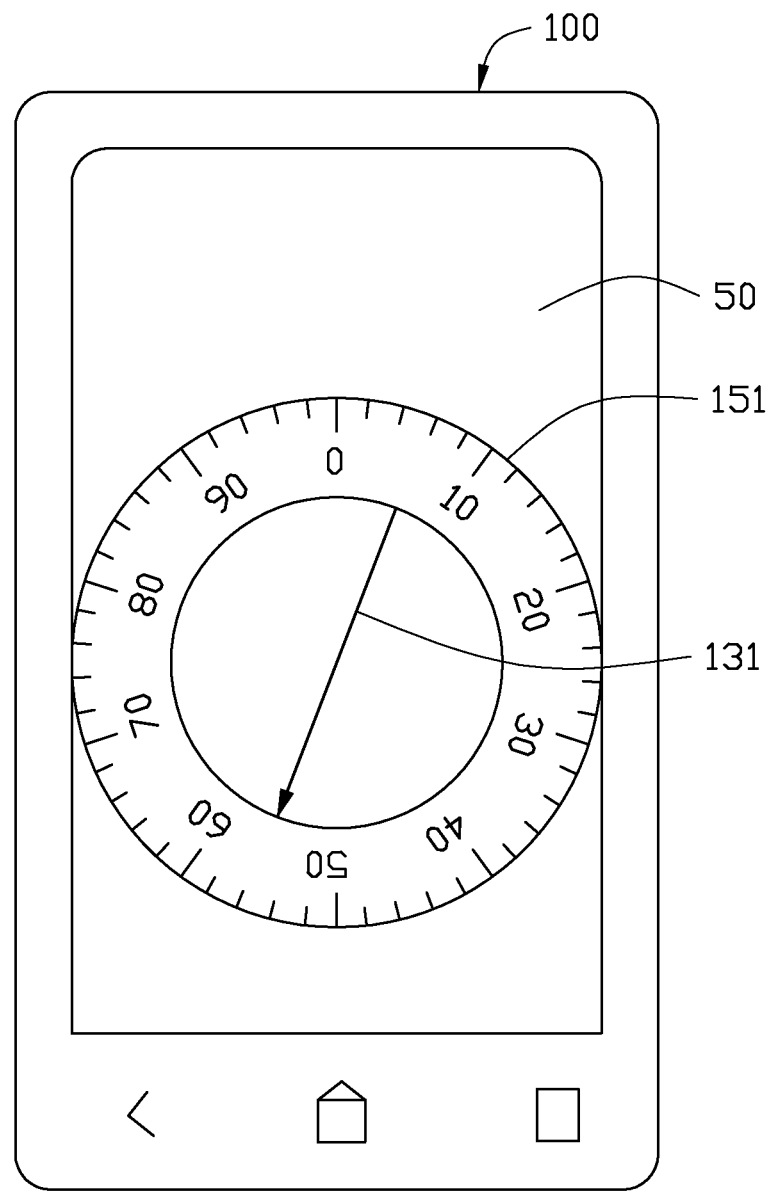
FIG. 2 is a schematic view of a mobile terminal in accordance with an embodiment of the disclosure.
Figure 3:
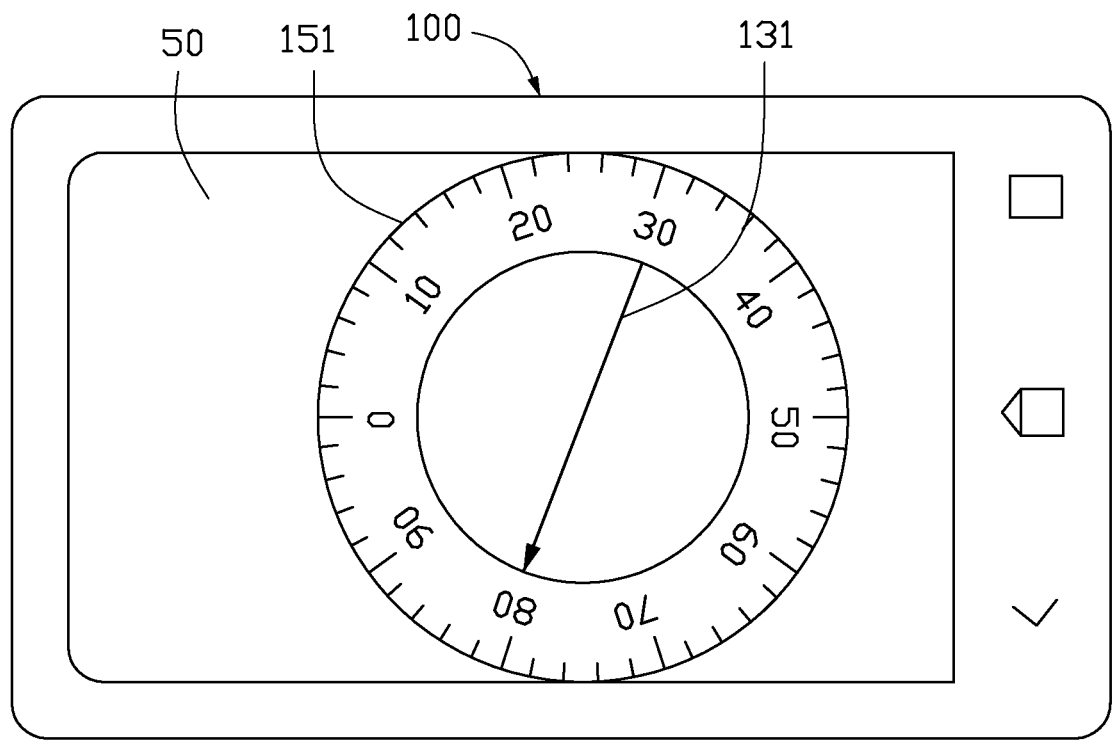
FIG. 3 is another schematic view of a mobile terminal in accordance with an embodiment of the disclosure.

FIGS. 1-3 show a mobile terminal 100 of an embodiment. The mobile terminal 100 includes a background system 10, a MEMS gyroscope 30, a touchpad 50, and a setting module 70. The setting module 70 is used for setting codes.

The background system 10 includes a control module 11, an indicating needle displaying module 13, and a divided circle displaying module 15. The indicating needle displaying module 13 is used for displaying an indicating needle 131 in the display 40 when the mobile phone needs to be unlocked. The divided circle displaying module 15 is used for displaying a divided circle in the touchpad 50. Each scale of the divided circle corresponds to unlocking data. The indicating needle 131 is located in the divided circle 151. The MEMS gyroscope 30 is used for holding the indicating needle 131 to be unmovable.

When the mobile terminal 100 needs to be unlocked, the divided circle rotates with the mobile terminal to enable the indicating needle to be aligned with a current scale of the divided circle. The touchpad 50 sends the code, corresponding to the current scale, to the control module 11 after sensing a click gesture. The control module 11 compares received codes with the predetermined codes after receiving a plurality of codes from the touchpad 50. The control module 11 unlocks the mobile terminal 100 when the received codes match the predetermined codes. The control module 11 sends a fail signal to the touchpad 50. For example, predetermined codes are 561412. The divided circle 151 has 50 scales corresponding to numbers 0-100. The mobile terminal rotates to enable the indicating needle 131 to be aligned with the scale corresponding to the number 56. The touchpad 50 sends the number 56 to the control module 11 after sensing a click gesture. Then the mobile terminal 100 rotates to enable the indicating needle 131 to be aligned with the scale corresponding to the number 14. The touchpad 50 sends the number 14 to the control module 11 after sensing a click gesture. The mobile terminal 100 rotates to enable the indicating needle 131 to be aligned with the scale corresponding to the number 12. The touchpad 50 sends the number 12 to the control module 11 after sensing a click gesture.

Figure 4:
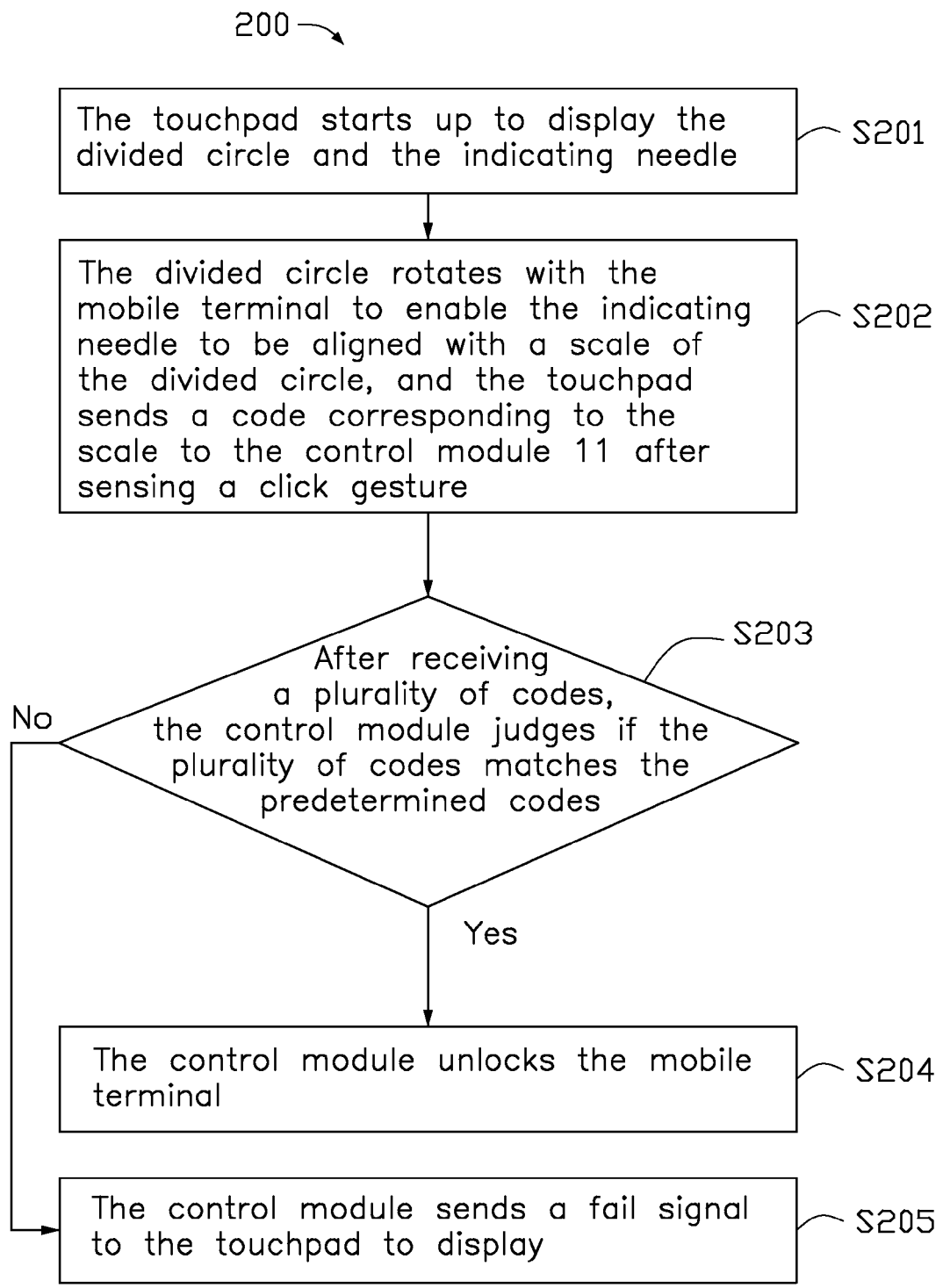
FIG. 4 is a flow chart of a mobile terminal unlocking method in accordance with an embodiment of the disclosure.

FIG. 4 shows a mobile terminal unlocking method 200 according to one embodiment of this disclosure. In step S201, the touchpad 50 starts up to display the divided circle 151 and the indicating needle 131.

In step S202, the divided circle 151 rotates with the mobile terminal to enable the indicating needle 131 to be aligned with a scale of the divided circle 151, and the touchpad sends a code corresponding to the scale to the control module 11 after sensing a click gesture.

In step S203, after receiving a plurality of codes, the control module 11 determines if the plurality of codes matches the predetermined codes. If so, the process continues step S204; if not, the process continues step S205.

In step S204, the control module 11 unlocks the mobile terminal.

In step S205, the control module 11 sends a fail signal to the touchpad 50 to display.

Steps S201-S205 can be implemented with other steps within this disclosure.

It is to be understood, however, that even though numerous characteristics and advantages of the embodiments have been set forth in the foregoing description, together with details of the structure and function of the embodiments, the disclosure is illustrative only, and changes may be made in detail, especially in the matters of shape, size, and arrangement of parts within the principles of the present disclosure to the full extent indicated by the broad general meaning of the terms in which the appended claims are expressed.

What is claimed is:

1. A mobile terminal, comprising:
    a touchpad;
    a background system, the background system comprising a control module, a indicating needle displaying module, and a divided circle displaying module; the indicating needle displaying module configured to display an indicating needle in the touchpad; the divided circle displaying module configured to display a divided circle in the touchpad; each scale of the divided circle corresponding to a code; the divided circle configured to rotate with the mobile terminal to enable the indicating needle to be aligned with one scale of the divided circle;
    a MEMS gyroscope, the MEMS gyroscope configured to hold the indicating needle to be unmovable;
    wherein the touchpad is configured to send the one code to the control module after sensing a click gesture; the control module is configured to unlock the mobile terminal after determining that a plurality of codes sent by the touchpad matches predetermined codes.

2. The mobile terminal of claim 1, wherein the control module is configured to send a fail signal to the touchpad to display after determining that the plurality of codes does not match the predetermined codes.

3. The mobile terminal of claim 1, wherein the indicating needle is configured to be located in the divided circle.

4. A mobile terminal unlocking method, applied in a mobile terminal, the method comprising:

displaying, by a background system of the mobile terminal, an indicating needle and a divided circle in a touchpad of the mobile terminal, each scale of the divided circle corresponding to a code; and the indicating needle being held to be unmovable;

sending, by the touchpad, one code to the background system after sensing a click gesture when the mobile terminal rotates to enable the indicating needle to be aligned with one scale of the divided circle corresponding to the one code; and unlocking, by the background system, the mobile terminal after judging that received codes, sent from the touchpad, matches predetermined codes.

5. The mobile terminal unlocking method of claim 4, further comprising sending a fail signal to the touchpad to display by the background system after judging that the received codes does not match predetermined codes.

6. The mobile terminal unlocking method of claim 4, wherein the indicating needle is configured to be located in the divided circle.

* * * * *